March 8, 1960  R. M. CARRIER, JR  2,927,683
DRIVE FOR A HELICAL VIBRATORY CONVEYOR
Filed Dec. 26, 1957  3 Sheets-Sheet 1
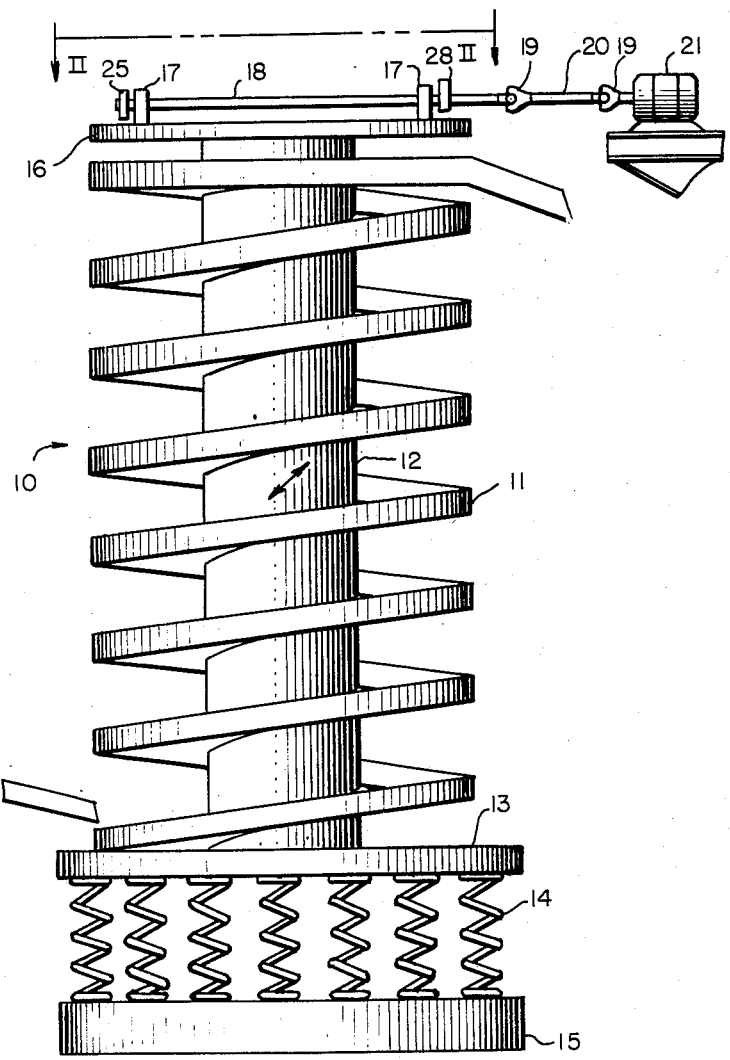
Fig. I
INVENTOR.
ROBERT M. CARRIER JR.
BY
ATTORNEYS

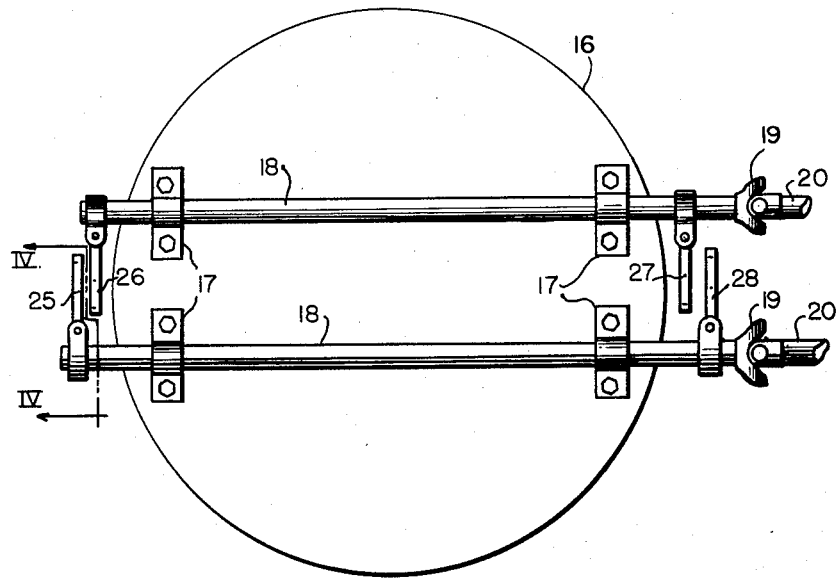
Fig. II
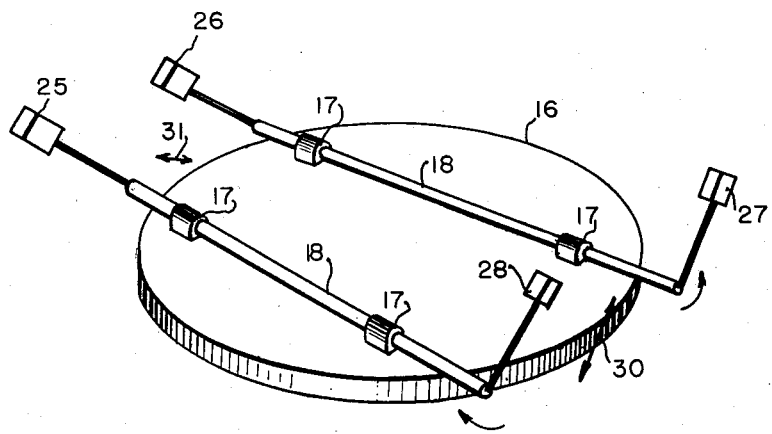
Fig. III
INVENTOR.
ROBERT M. CARRIER JR.
BY
ATTORNEYS March 8, 1960 R. M. CARRIER, JR 2,927,683
DRIVE FOR A HELICAL VIBRATORY CONVEYOR
Filed Dec. 26, 1957 3 Sheets-Sheet 3
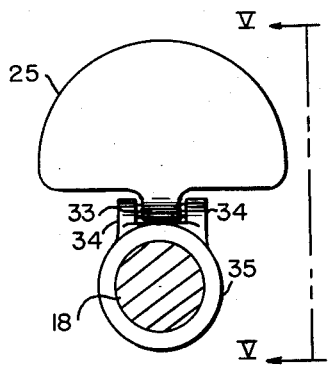
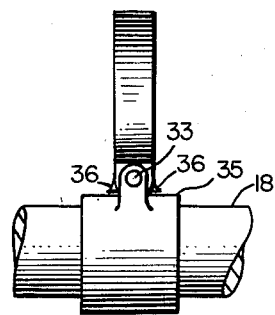
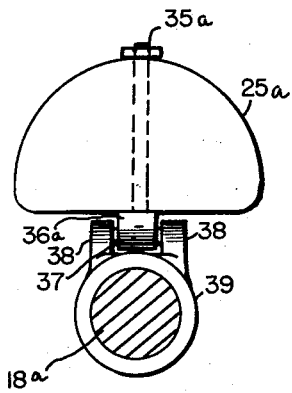
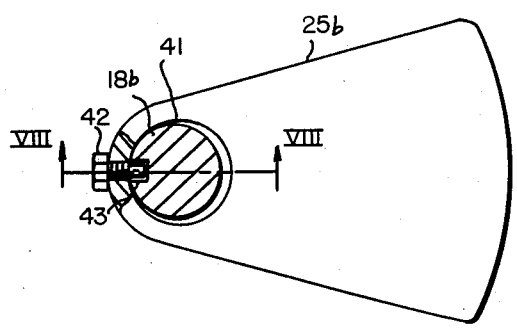
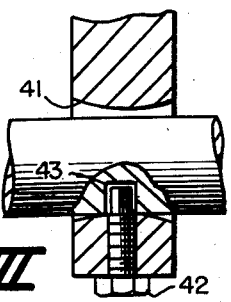
INVENTOR.
ROBERT M. CARRIER JR.
BY
*Marshall, Marshall & Yeasting*
ATTORNEYS United States Patent Office 2,927,683
Patented Mar. 8, 1960

2,927,683
DRIVE FOR A HELICAL VIBRATORY CONVEYOR

Robert M. Carrier, Jr., Louisville, Ky., assignor to Carrier Conveyor Corporation, Louisville, Ky., a corporation of Kentucky Application December 26, 1957, Serial No. 705,245
8 Claims. (Cl. 198—220)

This invention relates to helical conveyors and in particular to an improved drive mechanism suitable for use on large helical conveyors.

A rotating eccentric weight is one of the most practical vibration exciters in common use. It is also well-known to use two co-planar contra rotating eccentric weights to obtain a straight line vibratory force suitable for operating a vibratory conveyor or similar structure. A helical conveyor differs from the ordinary straight line conveyor in that it must be given a helical vibration so that material can be conveyed along the ascending helical path. This requires the use of a number of eccentric weights properly distributed on parallel shafts extending transversely to the axis of the conveyor and, optionally, the use of guide rods or similar means to confine the motion of the conveyor to the desired helical path. When eccentric weights are used on such a helical type of conveyor difficulty is often experienced with shaft breakage resulting from the precessional force of the eccentric weights trying to bend the shaft as their planes of rotation rotate according to the circular components of the helical vibratory motion.

The principal object of this invention is to provide an eccentric weight drive system for a helical conveyor in which the shafts are not subjected to precessional force from the weights.

Another object of the invention is to provide an improved mounting means for eccentric weights carried on shafts subjected to angular accelerations about axes transverse to the shafts so that the shafts are not subjected to gyroscopic precessional forces from such angular motions.

According to the invention the drive for a helical conveyor comprises a pair of generally parallel, contra rotating shafts mounted on the conveyor transversely to its axis with each of the shafts carrying a pair of eccentric weights. The weights are phased so that the resultant of the forces resulting from the unbalance of a pair of oppositely turning weights at one side of the conveyor is directed along a path generally parallel to the helix of the conveyor on that side, while the pair of weights on the opposite ends of the shafts are phased so that the resultant force on that side of the conveyor is also generally parallel to the helix on that side. The net effect of the combination of these forces is a balanced helically directed force applied to the conveyor with little or no tendency to vibrate it laterally. The invention further contemplates hinging or otherwise loosely connecting the eccentric weights to the shafts so that the rotating shafts may partake of the helical motion of the conveyor without disturbing the plane of rotation of each of the eccentric weights.

Preferred forms of the invention are illustrated in the accompanying drawings.

Fig. I is a side elevation of a helical conveyor equipped with the improved eccentric weight vibrator drive.

Fig. II is a plan view of the conveyor as seen from the line II—II of Fig. I.

Fig. III is a schematic illustration to show the relative positioning of the eccentric weights on the shafts to secure the properly directed vibrational forces.

Fig. IV is a fragmentary detail view as seen from the line IV—IV of Fig. II.

Fig. V is a detail view as seen from the line V—V of Fig. IV.

Fig. VI is a fragmentary detail view of another method of mounting the eccentric weight to provide a greater degree of freedom.

Fig. VII is a fragmentary detail of another method of mounting the eccentric weight to provide freedom of movement of the weight without bending the supporting shaft.

Fig. VIII is a fragmentary section as seen from the line VIII—VIII of Fig. VII.

These specific figures and the accompanying description are intended merely to illustrate the invention and not to impose limitations on its scope.

A vibratory drive constructed according to the invention is suitable for use with a helical conveyor such as is shown in Fig. I. Such a conveyor 10 comprises a helical trough 11 that is helically wound around and supported on a central support tube 12 which in turn is erected on a base 13 carried on a plurality of coil springs 14 resting on a foundation 15. The coil springs provide a resilient support for conveyor 10. A platform or upper base 16 mounted on the upper end of the support tube 12 carries a plurality of bearings 17 for a pair of cross shafts 18 that are connected through universal joints 19 and splined shafts 20 to a drive motor 21. Gearing at the motor, not shown, is arranged to drive the shafts in opposite directions at equal speed.

Eccentric weights 25, 26, 27, and 28 are mounted on the shafts 18 near the periphery of the base 16 which corresponds roughly in size to a single turn of the helical conveyor trough 11. The eccentric weights 25–28 inclusive are uniform in weight and eccentricity and are mounted on the counter-rotating shafts 18 in such positions that the resulting forces from the unbalanced weights produce a helical vibratory motion of the conveyor 10.

The relative positioning of the weights on the shafts to produce the required motion is indicated in Fig. 3. As indicated in this figure, the shaft carrying the eccentric weights 25 and 28 rotates clockwise while the shaft carrying the weights 26 and 27 rotates counterclockwise. In the particular position shown the weights 27 and 28 are each extended upwardly and to the right at an angle of about 45° to the plane of the shafts 18 so that the resulting force of the two weights is directed upwardly and to the right at the corresponding angle. At the same instant in time the weights 25 and 26 are extending upwardly and to the left so as to apply force to the upper base 16 in a corresponding direction. Thus, in a particular arrangement shown, the vertical components of the resultant forces are in phase to produce a vertical component of vibration while the horizontal components of the resultants are tangentially directed to produce a rotary or circular component of vibratory motion. The combination of the circular and vertical movement of the base 16 results in the desired helical motion of the conveyor 10. This motion is, on the near edge of the upper base 16, indicated by a short, double-headed arrow 30 while the corresponding motion on the diametrically opposite side of the upper base 16 is indicated by a second double-headed arrow 31.

It should be pointed out that with the particular combination of weight positions provided at each edge of the conveyor the resulting vibratory force is directed along a line at a 45° angle to the surface of the upper base 16 and that variations in the line of action of the resultants may be obtained by proper variation in the angular position of the weights on the shafts. In addition, there is a torque applied to each side of the upper base 16 tending to twist the base because of a fact that the resultant force of the pair of weights is not perpendicular to the plane through the axes of the shafts 18. Thus when the weights have rotated 90° from the position shown, the weight 27 pulls upwardly and to the left on the one shaft while the weight 28 pulls downwardly and to the right on the other shaft. Since these forces are not concurrent they result in a couple applied to the base tending to twist it. The base 16 may easily be made sufficiently rigid to withstand this force.

As conveyor 10 and its upper base 16 undergoes the helical vibration, each of the shafts 18 rotates through a small but substantial angle about a vertical axis in addition to its vertical motion and rotation about its own axis. If the eccentric weights 25–28 inclusive are made in the form of unbalanced flywheels mounted on the shafts, this angular motion of the shafts about the vertical axis, because of the gyroscopic precessional forces, tends to bend the shafts up or down at each of the weights. This bending stress has been found to cause early failure of the shafts.

This bending condition, due to the gyroscopic forces, can be minimized at least in the direction of the maximum stress by employing a single hinge pin to connect each weight to its shaft. Thus the weight 25 may be constructed as shown in Fig. IV with a hinge pin 33 extending at right angles to the shaft 18 and fitted into ears 34 extending laterally from a collar 35 mounted on the shaft 18. The hinge pin connection between the weight 25 and the collar 35 on the shaft 18 permits the weight 25 to maintain a constant plane of rotation that is normal to the average position of the shaft 18 as the shaft follows the circular motion of the base 16.

It is desirable to limit the angular motion of the weight 25 relative to the shaft 18 and this is accomplished by limit stops 36, Fig. V, that project from the weight 25 on each side of the hinge pin 33 in position to engage to adjacent surfaces of the collar 35 when the weight swings to a small angle in either direction from a plane perpendicular to the shaft.

The single hinge pin connection of Fig. IV or V does not provide for angular motion of the shaft 18, when the plane of such motion is parallel to the hinge pin 33. Such motion tends to rotate the weight 25 about an axis transverse to the hinge pin 33 and thus provides a reacting moment back onto the shaft 18 tending to bend the shaft. This can be eliminated by mounting a weight 25a on a stem 35a of a T-bolt 36a, the T portion of which fits over a hinge pin 37 mounted between ears 38 of a collar 39 fitting over the shaft 18a as shown in Fig. VI. This arrangement provides a nearly universal movement of the weight 25a relative to the shaft 18a in that it can swivel on the stem 35a of the T-bolt to accommodate angular movement of the shaft 18a in one direction and the T-bolt itself can swivel on the hinge pin 37 to accommodate angular motion of the shaft 18a in a direction at right angles to the first. This arrangement serves as a universal joint connecting the weight to the shaft.

A simple arrangement of accomplishing the same results is illustrated in Figs. VII and VIII. In this arrangement an eccentric sector-shaped weight 25b is provided with a bore or opening 41 that is a clearance fit over a shaft 18b. The bore 41 is off center with respect to the center of gravity and near the small end of the eccentric weight 25b so that most of the mass of the weight 25b is effective as an unbalanced mass. The weight 25b is loosely held in position on the shaft by a bolt 42 that is threaded into the end of the eccentric weight 25b so that it extends into the bore 41 and engages a shallow transverse hole 43 drilled in the shaft 18b. A depth of the hole 43 is slightly greater than the clearance between the shaft 18b and the internal periphery of the bore 41 so that the bolt 42 cannot become disengaged from the hole 43.

Because of the clearance provided between the shaft and the periphery of the bore 41 the weight 25b is free to wobble on the shaft 18b as may be required to accommodate the angular motion of the shaft 18b transverse to its axis of rotation without requiring that the weight 25b depart from its plane of rotation. This rocking action is accommodated, as shown in Fig. VIII, by making the bore 41 slightly bell-shaped in cross section, that is diverging toward the ends of the hole 41 at the sides of the weight 25b.

If desired, a collar or bushing may be mounted on the shaft 18b and fitted into the hole in the weight 25b to provide additional strength and wear resistance.

The foregoing methods of loosely or hingedly mounting an eccentric weight on a drive shaft to minimizing the bending stresses transmitted to the drive shaft are intended to be illustrative only, and many other universal type mountings giving the required freedom may be employed without departing from the spirit and scope of the invention.

Having described the invention, I claim:

1. In a drive for a helical conveyor, in combination, a pair of shafts journaled on the conveyor in parallel relation and extending transversely of the axis of the conveyor, means for rotating the shafts in opposite directions, at least two unbalanced masses mounted on each shaft adjacent the periphery of the conveyor, and means for rotating the shafts and attached unbalanced masses in opposite directions at the same speed to produce helical vibration of the conveyor, said masses being hingedly attached to said shafts whereby the conveyor may oscillate in a helical path without transmitting angular acceleration forces to said masses.

2. In a drive for a helical conveyor, in combination, a pair of parallelly arranged shafts mounted on the conveyor transversely of the axis of the conveyor, a pair of masses pivotally mounted eccentrically on each shaft adjacent the periphery of the conveyor, and means for rotating the shafts and attached masses in opposite directions at the same speed, said masses being angularly positioned on the shafts such that the resultant force of a pair of said masses on each side of the conveyor is directed along a path inclined generally in the direction of flow of the material on that side of the conveyor.

3. In a drive for a helical conveyor, in combination, a pair of parallelly arranged shafts mounted on the conveyor and extending transversely of the axis of the conveyor, means for rotating said shafts at equal speeds in opposite directions, a pair of eccentric weights pivotally mounted on each of the shafts adjacent the periphery of the conveyor, said weights cooperating to induce helical vibration of the conveyor and pivoting with respect to the shafts to accommodate angular movement of the shaft axes without change of the axis of spin of the weights.

4. A drive for a helical conveyor in which a plurality of weights are pivotally mounted on parallel contra-rotating shafts that are mounted on the conveyor and extend transversely to its axis to induce helical motion of the conveyor, in which the pivotal connection between each shaft and each weight comprises a hinge having its pin extending transversely to the shaft.

5. A drive for a helical conveyor in which a plurality of weights are pivotally mounted on parallel contra-rotating shafts that are mounted on the conveyor and extend transversely to its axis to induce helical vibratory motion of the conveyor, in which the pivotal connection between the weights and the shafts comprise compound hinges the turning axis of which are transverse to each other and to the shaft.

6. A drive for a helical vibratory conveyor comprising a plurality of weights that are pivotally mounted on parallel contra-rotating shafts that are mounted on the conveyor and extend transversely to its axis to induce helical vibratory motion of the conveyor in which the pivotal mounting for each weight comprises a universal hinge having crossed pin axes each of which is transverse to the axis of the shaft.

7. A drive for a helical vibratory conveyor comprising a plurality of weights, a pair of contra-rotating shafts mounted on the conveyor and extending transversely to its axis, means for driving the shafts, and means for mounting the weights on the shafts, said means each comprising pivotal members providing at least one pivoting axis transverse to the axis of the shaft.

8. A drive for a helical vibratory conveyor comprising, in combination, a pair of parallel shafts journaled on the conveyor and extending transversely to its axis, means for rotating the shafts in opposite directions at equal speeds, and a pair of unbalanced weights carried on each of the shafts, said weights being angularly located on said shafts to induce helical vibration of the conveyor and each being loosely connected to the shaft to permit angular movement of the shaft relative to the plane of rotation of the weight.

References Cited in the file of this patent

UNITED STATES PATENTS

| | | |
|---|---|---|
| 883,526 | Combs | Mar. 31, 1908 |
| 2,827,157 | Tsuchiya et al. | Mar. 18, 1958 |